US010718391B1

(12) United States Patent
Winslow et al.

(10) Patent No.: US 10,718,391 B1
(45) Date of Patent: *Jul. 21, 2020

(54) REDUNDANT SEAL FOR WIND TURBINE HYDRAULIC BRAKES

(71) Applicant: Wind Solutions, LLC, Sanford, NC (US)

(72) Inventors: Christopher James Winslow, Lemon Springs, NC (US); Matthew Kenneth King, Carthage, NC (US)

(73) Assignee: Wind Solutions, LLC, Sanford, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,598

(22) Filed: May 23, 2019

Related U.S. Application Data

(63) Continuation of application No. 16/377,683, filed on Apr. 8, 2019.

(Continued)

(51) Int. Cl.
*F16D 55/18* (2006.01)
*F16D 55/226* (2006.01)
(Continued)

(52) U.S. Cl.
CPC .......... *F16D 55/226* (2013.01); *F03D 7/0204* (2013.01); *F03D 80/88* (2016.05); *F16D 65/14* (2013.01); *F16D 2125/08* (2013.01)

(58) Field of Classification Search
CPC ....... F16D 2125/08; F03D 7/02; F03D 7/0204
See application file for complete search history.

(56) References Cited

U.S. PATENT DOCUMENTS

| 5,429,038 A * | 7/1995 | Black ............ F15B 15/1433 92/153 |
| 2010/0096222 A1* | 4/2010 | Kang ............ F16D 65/18 188/72.3 |

(Continued)

FOREIGN PATENT DOCUMENTS

| CN | 205745023 U | * 11/2016 | |
| EP | 2628948 A2 * | 8/2013 | ........... F03D 7/0204 |

OTHER PUBLICATIONS

English-language abstract of EP 2628948 (no date).*
Machine translation of CN 205745023 (no date).*

*Primary Examiner* — Nicholas J Lane
(74) *Attorney, Agent, or Firm* — Leveque IP Law, P.C.

(57) ABSTRACT

A caliper brake featuring a hydraulic piston assembly includes a housing, a movable piston within a chamber of the housing, a first port providing a first fluid pathway into the chamber, and a redundant seal assembly. The redundant seal assembly may include a first pressure seal disposed about a first interior circumference of the chamber disposed above the first port, a second pressure seal disposed about a second interior circumference of the chamber disposed above the first pressure seal, and a second port disposed between the first pressure seal and the second pressure seal, the second port providing a second fluid pathway from inside of the chamber to outside of the chamber, and the second port establishing a bleed-off for fluid traversing above the first pressure seal such that the second pressure seal experiences a lower fluid pressure than the first pressure seal during normal operation of the caliper brake.

16 Claims, 8 Drawing Sheets

Section A-A

Related U.S. Application Data

(60) Provisional application No. 62/807,438, filed on Feb. 19, 2019.

(51) Int. Cl.
| | | |
|---|---|---|
| *F16D 65/14* | (2006.01) | |
| *F03D 80/80* | (2016.01) | |
| *F03D 7/02* | (2006.01) | |
| *F16D 125/08* | (2012.01) | |

(56) References Cited

U.S. PATENT DOCUMENTS

2011/0012360 A1\* 1/2011 Numajiri ............... F03D 7/0204
  290/55
2019/0136977 A1\* 5/2019 Prouzet .................. F16J 15/004

\* cited by examiner

Section A-A

REDUNDANT SEAL FOR WIND TURBINE HYDRAULIC BRAKES

CROSS-REFERENCE TO RELATED APPLICATIONS

This application is a continuation of U.S. patent application Ser. No. 16/377,683 filed on Apr. 8, 2019, which claims the benefit of U.S. Provisional Patent Application No. 62/807,438 filed on Feb. 19, 2019, the entire contents of which are hereby incorporated by reference.

BACKGROUND

Wind turbines, especially utility-scale wind turbines, may include a yaw braking system that holds the wind turbine pointed into the wind, or that otherwise provides a resistance or damping to rotation of the wind turbine. Similar to conventional braking systems, pads or the like (e.g., yaw pads) may be employed to engage with a mating surface of the wind turbine referred to as a slew ring, which may be made of steel or the like. In particular, many wind turbines utilize a gliding yaw bearing arrangement that allows a nacelle of the wind turbine to rotate about a wind tower in a smooth and controlled manner. The yaw bearings may absorb large static and dynamic loads and moments during the wind turbine operation, and are structurally configured to provide smooth rotational characteristics for the orientation of the nacelle under many weather conditions. To this end, the yaw bearings may include relatively robust braking systems and assemblies.

In particular, the yaw pads may be coupled to a movable piston to provide predetermined ranges of pressure when engaging a slew ring of a wind turbine. In some instances, the movable piston is part of a hydraulic piston assembly, e.g., in a caliper-type yaw brake with yaw pads that engage a slew ring on opposite surfaces thereof (essentially squeezing the slew ring between two yaw pads), or otherwise in an assembly where a hydraulic piston is activated to engage one or more surfaces of a slew ring. Hydraulic piston assemblies of caliper-type yaw brakes may include a housing with a chamber containing the movable piston, where movement of the piston is provided by a pressurized, hydraulic fluid (e.g., oil) that enters the chamber through a hydraulic port. Typically, the hydraulic piston assembly will include a single high-pressure seal around an interior circumference of the chamber to prevent or mitigate oil from entering a certain volume of the chamber from which it could leak. The hydraulic piston assembly may also include a single bleed-off port for disposing of oil that has entered a certain volume of the chamber. Thus, in some hydraulic piston assemblies, leak prevention is established by a single high-pressure seal and a single bleed-off port, where the last line of defense against a leak is a component of the hydraulic piston assembly that is not structurally configured to prevent such leaks—e.g., a scraper seal that is not designed to withstand pressure from hydraulic fluid, but instead is designed to exclude contamination from the assembly (i.e., a scraper seal is not designed to retain oil). In this manner, in existing hydraulic piston assemblies there is one seal designed to prevent contamination and one seal designed to prevent leaking, where this configuration often fails leading to leaks in the brake assemblies.

There remains a need for improved seals for hydraulic brakes, e.g., sealing techniques for use in caliper brakes featuring a hydraulic piston assembly for use in wind turbines.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
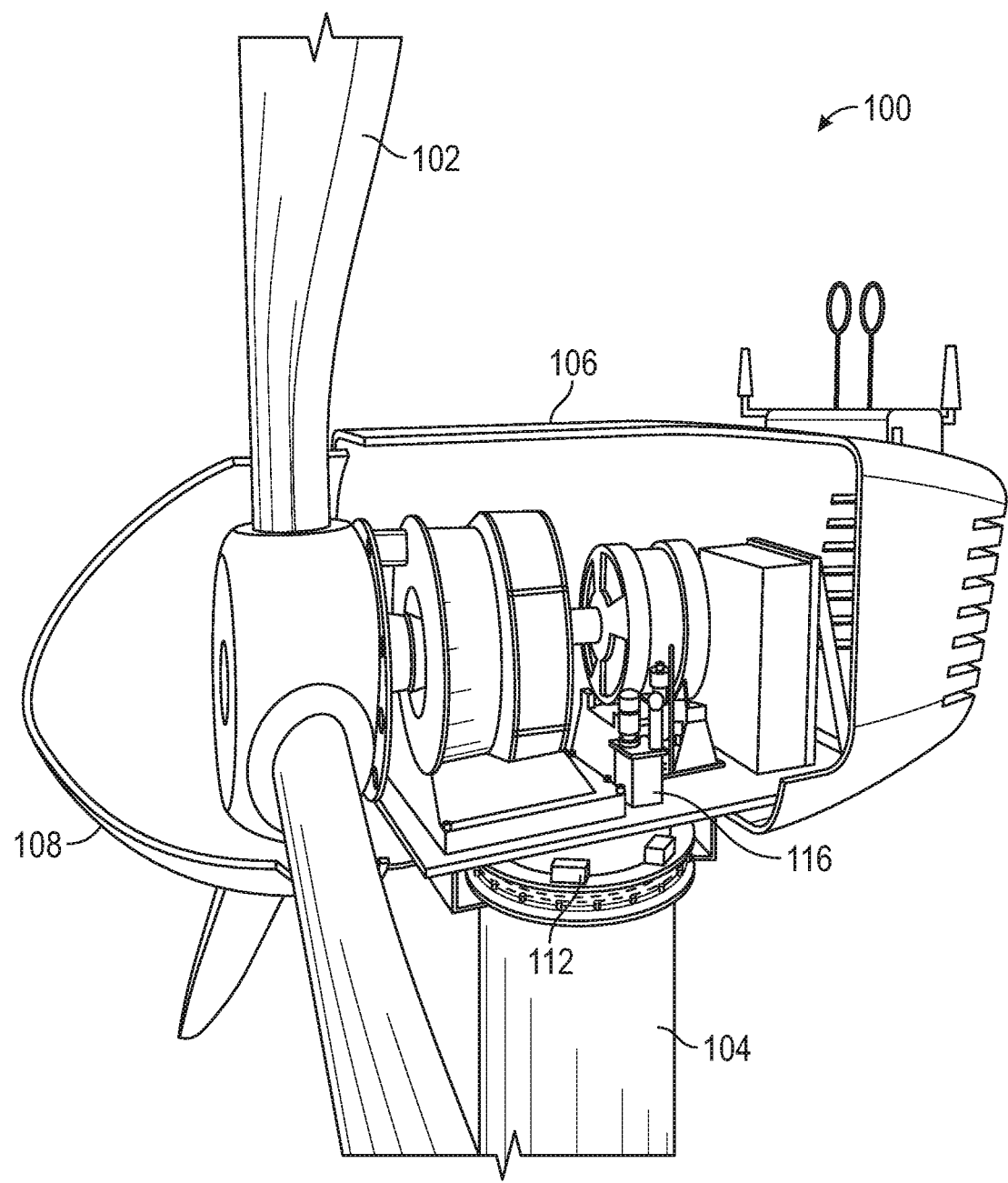
FIG. 1 illustrates a wind turbine for context.

The various methods, systems, apparatuses, and devices described herein may generally provide for sealing techniques for hydraulic pistons, e.g., a redundant seal for a hydraulic piston assembly of a caliper brake on a yaw braking system of a wind turbine.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, a redundant seal assembly for a hydraulic piston of a caliper-type yaw brake included on wind turbines and the like. However, it will be understood that the present teachings may also or instead be applied in other contexts apart from that of caliper-type yaw brakes, or yaw brakes generally that are included on wind turbines, and these other contexts are included within the scope of the present teachings. Thus, it will be understood that while the present disclosure may emphasize and describe the present teachings in the context of caliper-type yaw brakes, the present teachings may be adapted for use in other types of yaw braking systems featuring hydraulic piston assemblies apart from caliper-type yaw brakes. Similarly, the present teachings may be adapted for use in other hydraulic piston assemblies that may be present in other systems and devices apart from yaw braking systems, e.g., in contexts outside of wind turbines. It will further be understood that any of the yaw brakes (caliper-type or otherwise) discussed herein may contain multiple pistons therein—e.g., a caliper casting may have 1-5 bores/pistons (or more) installed therein.

Before describing the present teachings including a redundant seal assembly for a hydraulic piston, a wind turbine and a yaw brake are described below for context. Also, or instead, further description of wind turbines, yaw brakes, slew rings, and so on, can be found in Int'l Patent Application No. PCT/US2016/031558, published as WO 2016/183045, which is hereby incorporated by reference herein in its entirety. Thus, it will be understood that the wind turbines described herein and any components thereof, such as the yaw brakes and yaw systems, may be the same or similar to those described in aforementioned Int'l Patent Application No. PCT/US2016/031558. Also, or instead, the wind turbines described herein and any components thereof, such as the yaw brakes and yaw systems, may be the same or similar to others that are known in the technical field of wind turbines and the like. As such, it will be understood that the devices, systems, and methods described herein may be used with, or may be adapted for use with, any of the aforementioned or foregoing wind turbines and components thereof.

FIG. 1 illustrates a wind turbine 100 for context. The wind turbine 100 may generally be used for energy generation or conversion, e.g., for converting wind energy to electrical energy through movement of one or more turbine blades 102. The wind turbine 100 may include a tower 104 (e.g., which may be erected on a foundation or the like), a nacelle 106 mounted at a top end of the tower 104, and a rotor head 108 coupled to the nacelle 106 in a manner that permits rotation of the rotor head 108 relative to the nacelle 106. In general, the nacelle 106 may include a cover or housing that contains all or most of the generating components in a wind turbine 100, e.g., a generator, a gearbox, a drive train, a yaw bearing assembly, and a brake assembly.

The wind turbine 100 may include a plurality of turbine blades 102 (e.g., three in this exemplary embodiment) that are attached to the rotor head 108 (or otherwise to the nacelle 106 or one or more of its internal components) in a radiating pattern. In use, wind striking the turbine blades 102 may cause the rotor head 108 and a rotor shaft to rotate, where a generator or similar is structurally configured to convert this rotational force to energy such as electricity. Also, or instead, the turbine blades 102 may be connected to the rotor head 108 (or otherwise to the nacelle 106 or one or more of its internal components) in a manner facilitating movement with respect to the wind direction, thus making it possible to change pitch angles of the turbine blades 102. To this end, in certain embodiments, a wind vane may detect wind direction and provide data related thereto to a controller (e.g., a programmable logic controller (PLC) or similar) to trigger a yaw mechanism to adjust the yaw of the nacelle 106.

In general, and as used herein, a yaw system of a wind turbine 100 may include a set of components structurally configured to facilitate the orientation of the rotor head 108 or the nacelle 106 towards the wind. The yaw system may include a yaw brake 112 for holding, locking, or otherwise steadying a position (e.g., yaw position) for the wind turbine 100 (e.g., the rotor head 108 or the nacelle 106 of the wind turbine 100). To this end, the yaw brake 112 may include one or more yaw pads (e.g., two yaw pads) engageable with a bearing surface, e.g., a slew ring, which may include a relatively large diameter disk made of steel or the like having a gear at a rim thereof. The yaw pad may include a dry or lubricated pad, e.g., made of bronze (or the like) or a composite material, that bears against the slew ring. The yaw pad may also or instead include an organic friction pad or a woven friction pad. The yaw pad may also or instead include a steel backer with a friction material affixed thereto, e.g., similar to a brake pad in an automobile. It will be understood that the yaw pad may also or instead include, or may otherwise be referred to in the art as, a yaw bearing, a gliding yaw pad, a gliding yaw bearing, a yaw bearing pad, a yaw brake pad, a yaw puck, and so on. Regardless, in general, the yaw pad may be structurally configured and positioned to stabilize rotation of the nacelle 106 of the wind turbine 100, and to generally provide relatively smooth rotation of the nacelle 106 into the wind under a wide range of weather conditions. As stated above, the material of the yaw pad may include without limitation one or more of brass, bronze (e.g., sintered bronze, oil impregnated bronze, and the like), a polymer, a composite, sintered metal, polyether ether ketone (PEEK), a layered synthetic fiber reinforced formulation (e.g., having a wear layer of polyester resin and fabric with polytetrafluoroethylene (PTFE) fibers), and so on.

In certain implementations, the yaw brake 112 may include a caliper-type brake, where the brake caliper fits over the slew ring like a clamp, and where the yaw pads compress or squeeze the slew ring. Also or instead, the yaw brake 112 may be hydraulically activated and controlled. That is, when activated, hydraulic fluid (e.g., oil or the like) may create hydraulic pressure on one or more pistons in the yaw brake 112 that are coupled to the yaw pad(s), forcing one or more of the yaw pads against the slew ring. The flow of hydraulic fluid may be controlled by a hydraulic power unit 116.

In setup and use, when the nacelle 106 of the wind turbine 100 is positioned on the tower 104, the pressure on each of the individual yaw pads of each yaw brake 112 may be adjusted in order to avoid un-even wear of the yaw pads and excessive loading on portions of the yaw pads and slew ring. In order to achieve a desired setup, an adjustment mechanism may be provided, which can enable technicians to adjust the contact pressure of each individual gliding element in a controllable and secure way. By way of example, a wind turbine 100 may include twelve to eighteen yaw brakes 112/yaw assemblies that are arranged around a large gear residing at the junction of the bottom of the nacelle 106 and the top of the tower 104. The yaw assemblies may be equally spaced (common for systems with eighteen yaw assemblies) or unequally spaced (common for systems with twelve yaw assemblies). The yaw assemblies may be situated in a substantially circular arrangement. In other examples, eighteen or more (or less) such yaw assemblies may be provided, e.g., twenty-four yaw assemblies. However, it will be understood that the number of yaw assemblies may vary between different designs, and that any number that is used in a design can incorporate the present teachings within one or more of its yaw assemblies. As discussed above, these yaw assemblies may utilize yaw pads that serve as gliding pads and are in sliding contact with the slew ring, which often forms a part of a gear and provides a surface upon which the yaw pads can glide. Additionally, the slew ring may include teeth at an outer periphery thereof to form a gliding-disk/gear-rim. The teeth may also or instead be located at the inner or the outer cylindrical face of the slew ring, while the arrangement of the yaw brakes 112 and their exact number and location can vary.

Thus, during operation, yaw pads or the like may be structurally configured to apply pressure (e.g., via pressure elements such as springs, or through hydraulic pressure) against the slew ring, e.g., to stabilize the nacelle 106 against undesirable movement. In particular, in certain embodiments, pressure elements may include a yaw piston that is activated hydraulically, by oil fed into a chamber at predetermined pressures or flows, where the chamber contains a piston that is coupled (directly or indirectly) to a yaw pad. Continuing with this example, the yaw piston, under hydraulic pressure, may press against the yaw pad to engage the yaw pad firmly against the slew ring.

Figure 2:
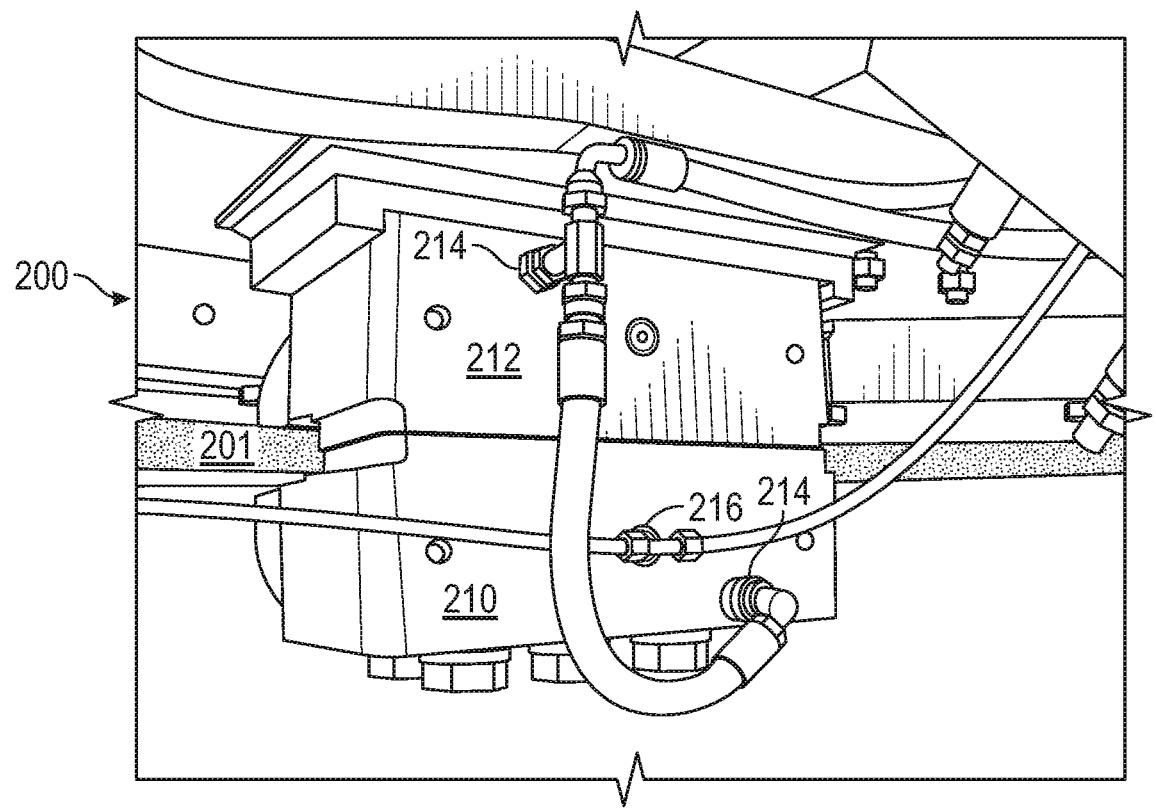
FIG. 2 depicts a caliper brake of a wind turbine for context.

FIG. 2 depicts a caliper brake 200 of a wind turbine for context. In general, the caliper brake 200 may be structurally configured for placement and securement on framework on the top of a wind turbine to apply a force to a slew ring 201 on a wind tower. As shown in the figure, the caliper brake 200 may include a first housing 210 and a second housing 212, where each housing contains a hydraulic piston assembly for hydraulically activating pistons that are coupled to yaw pads that engage the slew ring 201, e.g., in a clamping or squeezing configuration. The hydraulic piston assemblies of the two housings may work independently of one another (e.g., in a coordinated manner or otherwise), or may be activated and controlled together. The caliper brake 200 may further include input ports 214 for hydraulic fluid to enter the housings for activating the hydraulic pistons contained therein. The caliper brake 200 may also include one or more bleed-off ports 216 for excess or unwanted hydraulic fluid (e.g., from leakage) to be released from the housings.

Figure 3:
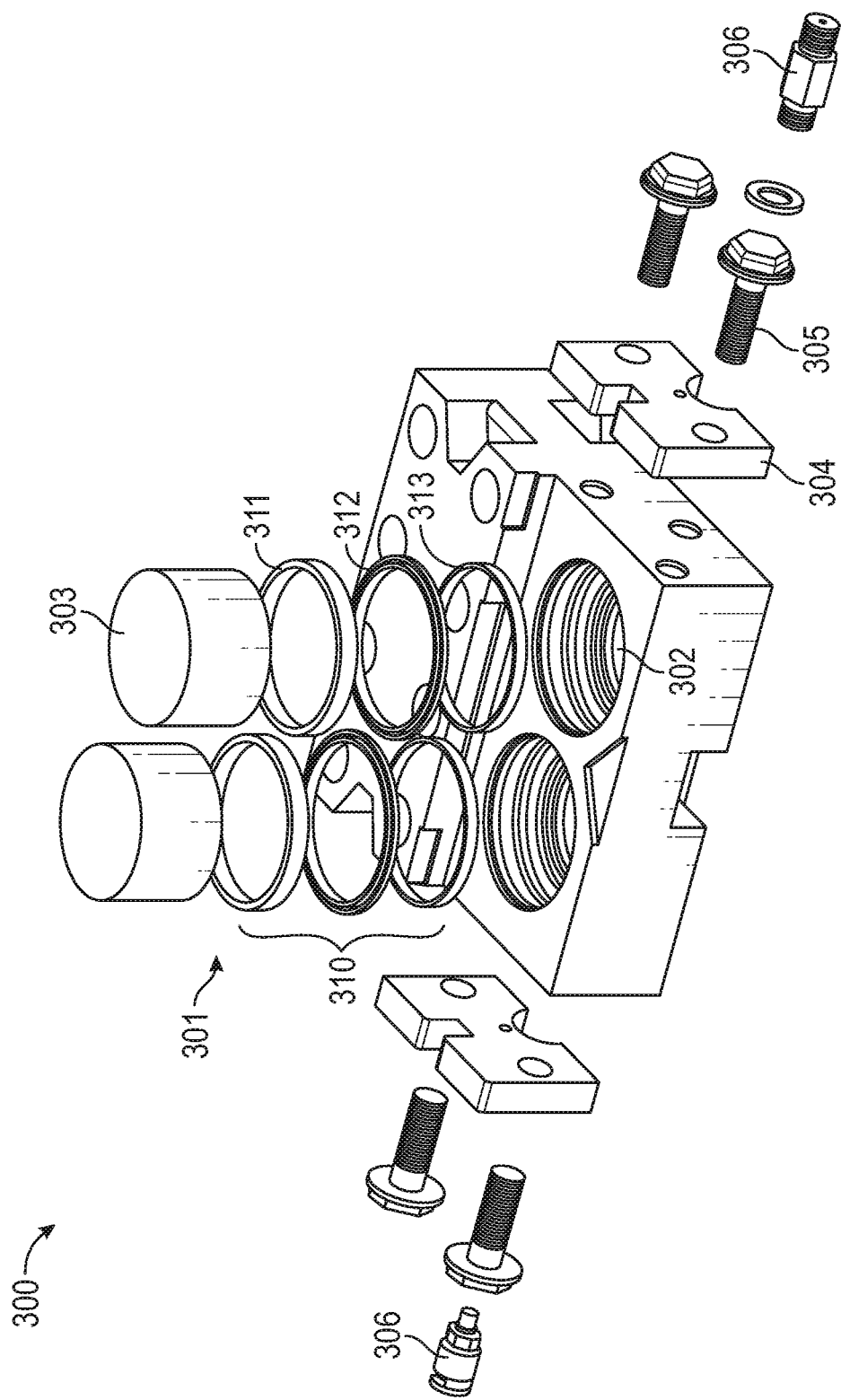
FIG. 3 is an exploded view of a hydraulic piston assembly of a caliper brake for a wind turbine for context.

FIG. 3 is an exploded view of a hydraulic piston assembly 301 of a caliper brake 300 for a wind turbine for context. Specifically, the caliper brake 300 may be a caliper-type yaw brake assembly such as those described above. As shown in the figure, the caliper brake 300 may include one or more hydraulic chambers 302, each containing a piston 303 that is movable relative to the chamber 302. Other components of the caliper brake 300 that are shown in the figure include end caps 304, fasteners 305 (e.g., bolts, screws, or the like), and port connectors 306 (e.g., which may include valves, seals, or connecting adapters such as connectors for hydraulic ports of the caliper brake 300).

FIG. 3 shows and demonstrates an existing technique used for leak prevention, which is provided for context. In particular, the existing seal kit assembly 310 includes a plurality of seals and bearings including a scraper seal 311, a buffer seal 312, and a guide band 313.

The scraper seal 311 is structurally configured to exclude contamination from the system, not to prevent leaks by retaining hydraulic fluid within the system. Similar seals are also known in the art as wiper seals, rod wipers, excluder seals, and collars. The primary role of the scraper seal 311 is to provide a physical barrier to limit the ingress of moisture, dirt, and other contaminants from the piston 303 used in the hydraulic piston assembly 301. Thus, the scraper seal 311 is structurally configured to prevent external contamination from damaging internal seals and other system components, not to prevent the leaking of hydraulic fluid.

The buffer seal 312 may be the only main pressure seal within the hydraulic piston assembly 301. The buffer seal 312 is disposed between the piston 303 and the chamber 302 (i.e., piston bore), and may serve to "seal in" hydraulic fluid within a dedicated volume. The buffer seal 312 may also or instead be referred to in the art as a "step seal."

The guide band 313 may provide support to the piston 303 and/or may act as a bearing or barrier between the chamber 302 and the piston 303 in the hydraulic piston assembly 301. The guide band 313 may also or instead be referred to in the art as a "wear ring." It will be understood that one or more guide bands 313 may be included on any of the embodiments described herein, or an embodiments may lack guide bands 313 entirely.

Figure 4:
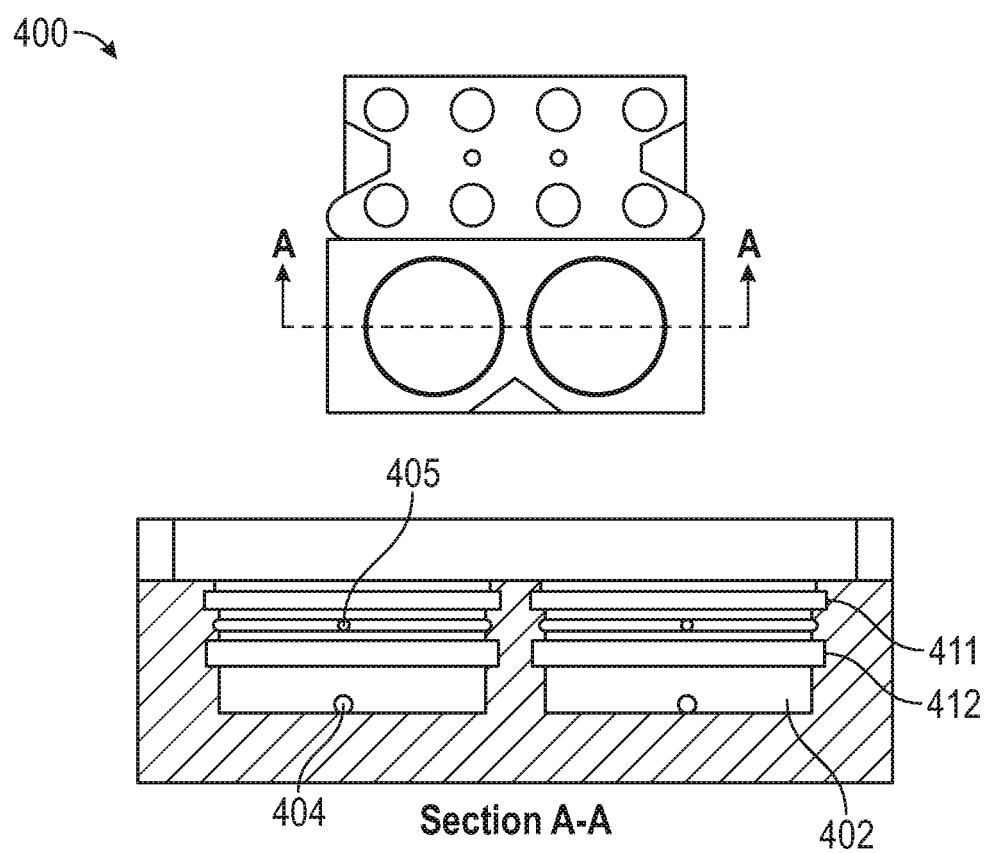
FIG. 4 illustrates a top view and a cross-sectional view of a caliper brake for a wind turbine for context.

FIG. 4 illustrates a top view and a cross-sectional view of a caliper brake 400 for context, where the caliper brake 400 may be the same or similar to that described above with reference to FIG. 3, e.g., an existing caliper brake 400. In FIG. 4, the cross-sectional view represents the view through Section A-A of the top view of the caliper brake 400.

As shown in FIG. 4, an existing hydraulic piston assembly of an existing caliper brake 400 may include a scraper seal 411, a single pressure seal 412 in each chamber 402, an inlet port 404, and a single bleed port 405.

Figure 5:
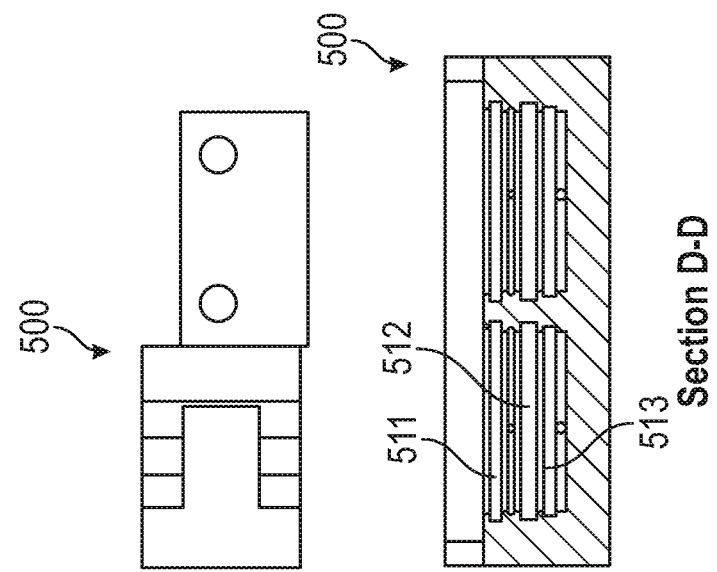
FIG. 5 illustrates various views of a hydraulic piston assembly of a caliper brake for a wind turbine for context.
Figure 5:
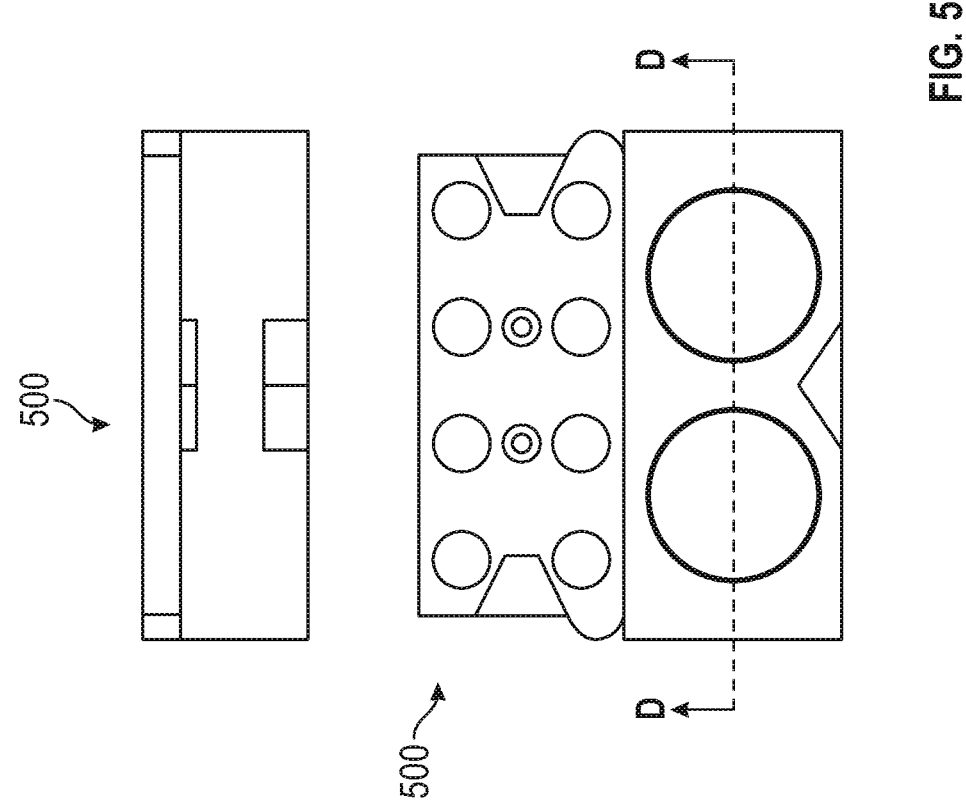

FIG. 5 illustrates various views of a caliper brake 500 of a wind turbine for context. The caliper brake 500 in FIG. 5 may be similar to that shown in FIG. 4—i.e., including a scraper seal 511 and a single pressure seal 512—but where the caliper brake 500 also includes a guide band 513.

Figure 6:
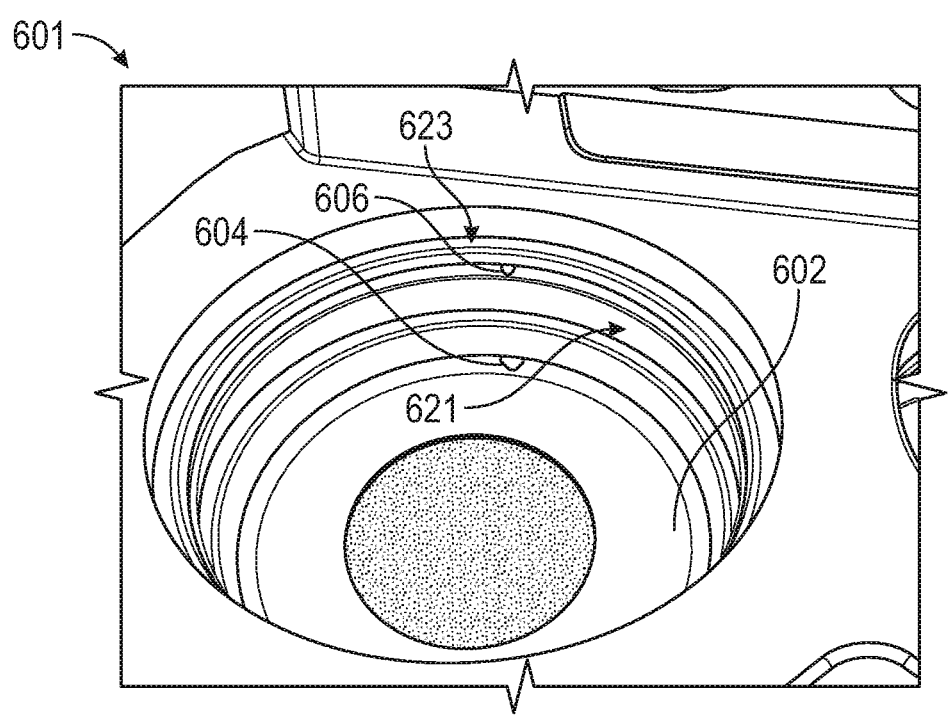
FIG. 6 depicts a housing of a hydraulic piston assembly for context.

FIG. 6 depicts a housing 601 of a hydraulic piston assembly for context. The housing 601 may, for example, be the same or similar to those that are present in any of the brakes shown with reference to FIGS. 3-5, e.g., assemblies that feature a single pressure seal in a chamber thereof. The housing 601 may include a chamber 602 structurally configured to contain at least part of a piston in a hydraulic piston assembly of a yaw brake, for example. For context, FIG. 6 shows a first interior circumference 621 of the chamber 602 in which a pressure seal may be located, and a top interior circumference 623 of the chamber 602 in which a scraper seal may be disposed. FIG. 6 also shows a first port 604 that may be a high-pressure inlet for hydraulic fluid to enter the chamber 602, and a bleed off port 606 disposed between the first interior circumference 621 and the top interior circumference 623.

Having provided context for the present teachings, hydraulic piston assemblies featuring redundant seals will now be discussed in more detail. That is, while existing hydraulic piston assemblies or the hydraulic piston assemblies with reference to FIGS. 3-6 may include only a single pressure seal, a hydraulic piston assembly according to the present teachings may include two or more pressure seals, which can further mitigate leaks of hydraulic fluid (e.g., oil) in such assemblies. Further, one or more additional bleed ports may be used in a hydraulic piston assembly according to the present teachings, e.g., where at least one of the bleed ports is used for recycling hydraulic fluid in such assemblies. A hydraulic piston assembly according to the present teachings may be particularly useful in the context of yaw brake assemblies for wind turbines as discussed herein.

Figure 7:
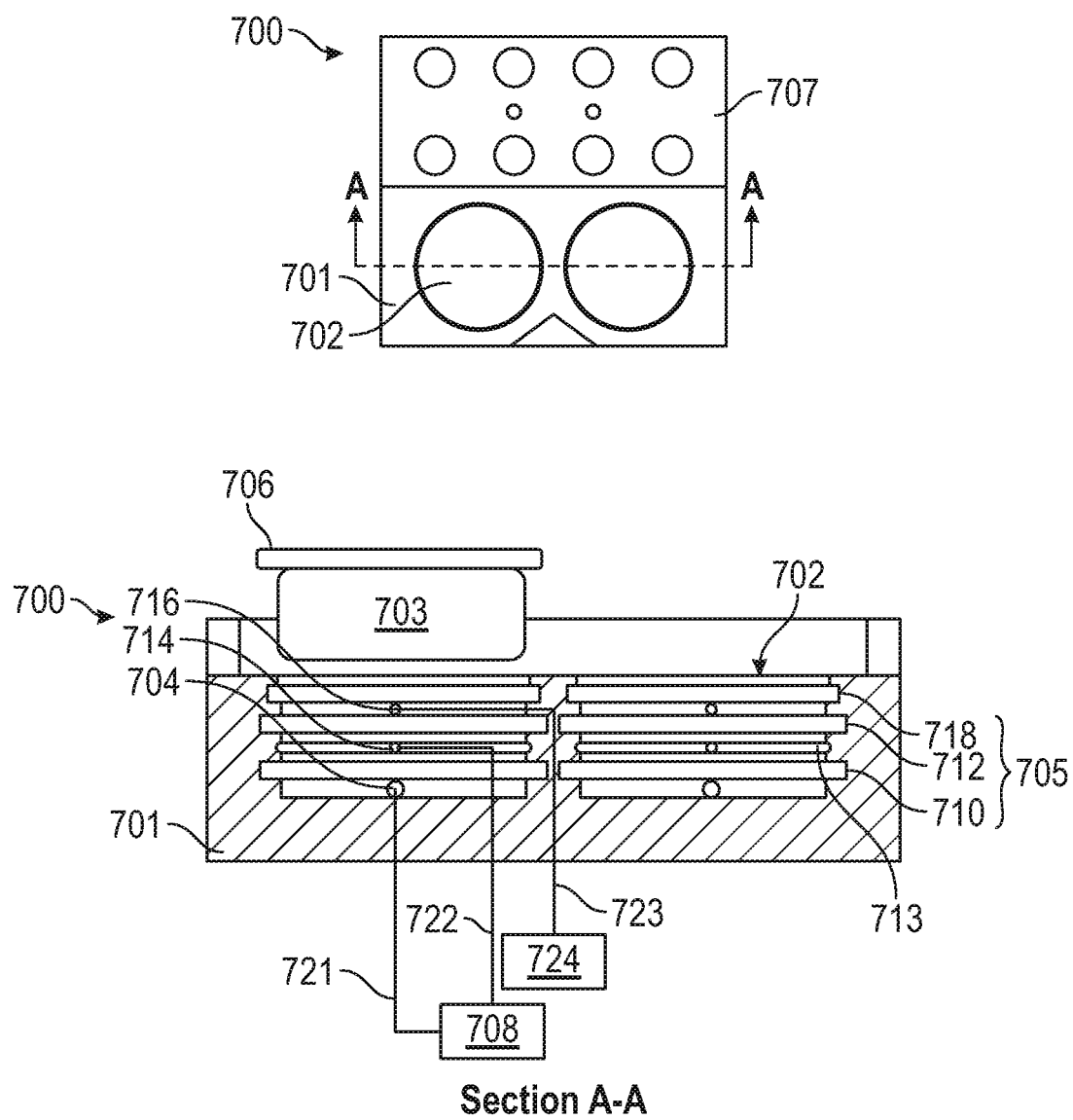
FIG. 7 illustrates a top view and a cross-sectional view of a hydraulic piston assembly of a caliper brake for a wind turbine, in accordance with a representative embodiment.

FIG. 7 illustrates a top view and a cross-sectional view of a hydraulic piston assembly 700 of a caliper brake for a wind turbine, in accordance with a representative embodiment. Thus, as discussed herein, the hydraulic piston assembly 700 may be structurally configured for use in a caliper brake of a yaw braking assembly on the top of a wind tower for orienting the nacelle and turbine blades. Stated otherwise, the caliper brake may include a yaw brake disposed on a wind turbine, where the yaw brake is structurally configured to direct a front end of a nacelle (i.e., an end of the nacelle that includes turbine blades) in a predetermined alignment relative to a direction of wind in an environment. However, as also discussed herein, the hydraulic piston assembly 700 may also or instead be structurally configured for other uses, as will be understood to a person skilled in the art of caliper brakes, hydraulic assemblies, and such. Further, the hydraulic piston assembly 700 may also or instead be adapted for use in non-caliper-type brakes or the like, on a wind turbine or otherwise, as will be evident to one skilled in the art.

In general, the hydraulic piston assembly 700 may include a housing 701 with one or more chambers 702, a piston 703, a first port 704, and a redundant seal assembly 705.

The housing 701 may generally contain components for the hydraulic piston assembly 700. In particular, the housing 701 may include one or more chambers 702, where these chambers 702 are structurally configured to contain at least a portion of a hydraulic piston 703 in the hydraulic piston assembly 700. Thus, a chamber 702 may define a piston bore, e.g., a substantially cylindrical bore that accommodates movement of the piston 703, but it will be understood that other shapes for the chamber 702 are also or instead possible. The chamber 702 may contain cutouts, ridges, or the like, e.g., around an interior circumference of the substantially cylindrical bore for placement of one or more seals (or other components, such as bearings or guides) of the redundant seal assembly 705. The chamber 702 may also contain one or more ports as described in more detail below.

The housing 701 may include, or may otherwise be coupled to, a mounting structure 707. The mounting structure 707 may be structurally configured to mount the housing 701, and thus the hydraulic piston assembly 700, to another structure such as a wind tower or a component or framing thereof. To this end, the mounting structure 707 may include one or more engagement features, such as bores for accepting one or more couplers/fasteners, such as bolts, screws, and the like.

The piston 703 may be disposed at least partially within a chamber 702 of the housing 701, where the piston 703 is movable relative to the housing 701. Specifically, the piston 703 may be movable via a force experienced by the piston 703, where the force is caused by a pressurized fluid that is introduced into the chamber 702 (and retracted out of the chamber 702) in a controlled manner. The piston 703 may be engaged (e.g., connected directly or indirectly) to a yaw pad 706 or another brake pad or the like. In this manner, the hydraulic piston assembly 700 may be part of a yaw brake (e.g., a caliper-type yaw brake) including a yaw pad 706 that is movable via the piston 703 to selectively engage with a slew ring of a wind turbine.

The first port 704 may establish a first fluid pathway 721 from a fluid source 708 into the chamber 702. As shown in the figure, the first port 704 may be disposed at or near a bottom of the chamber 702, where the "bottom" of the chamber 702 will be understood to be located opposite an end of the piston 703. Thus, a volume below the piston 703 (e.g., between the piston 703 and the first port 704) may be structurally configured for receiving, containing, holding, and releasing pressurized fluid to move the piston 703 (e.g., movement of the piston 703 would be up and down in the figure), where one or more seals may prevent the fluid from leaking into other volumes, e.g., inside or outside of the housing 701. In this manner, this volume below the piston 703 may be structurally configured to be a high-pressure volume in the chamber 702 when this volume contains hydraulic fluid, e.g., under normal operating conditions of the hydraulic piston assembly 700.

In general, the first port 704 may be structurally configured to permit a pressurized fluid to enter the chamber 702

(e.g., via a hose or other piping) from outside of the housing 701—e.g., from the fluid source 708. In certain implementations, the pressurized fluid is an oil, and the fluid source is a tank (e.g., an oil tank). The first port 704 may thus be structurally configured to receive, or the first port 704 may include, a hydraulic connector, valve, or the like, along with any appropriate sealing.

The redundant seal assembly 705 may generally include a plurality of pressure seals—e.g., at least two pressure seals. In particular, the redundant seal assembly 705 may include a first pressure seal 710 (e.g., a high-pressure seal) located about a first interior circumference of the chamber 702 and disposed above the first port 704, and a second pressure seal 712 (e.g., a low-pressure seal) located about a second interior circumference of the chamber 702 and disposed above the first pressure seal 710.

The redundant seal assembly 705 may further include a second port 714 (e.g., a primary bleed port) disposed between the first pressure seal 710 and the second pressure seal 712. The second port 714 may establish a second fluid pathway 722 from inside of the chamber 702 to outside of the chamber 702. More specifically, the second port 714 may establish a bleed-off for fluid that traverses above the first pressure seal 710 such that the second pressure seal 712 experiences a lower fluid pressure than the first pressure seal 710 during normal operation of the caliper brake or hydraulic piston assembly 700. It will be understood that "normal operation" shall mean operation of the system containing the hydraulic piston assembly 700 without failure, e.g., without leaking and under acceptable or standard operating conditions and parameters.

In certain implementations, the second fluid pathway 722 established by the second port 714 may lead from inside of the chamber 702 to the fluid source 708 to recycle fluid that traverses above the first pressure seal 710. As discussed above, the volume below the piston 703 may be a high-pressure volume in the chamber 702 e.g., a volume where pressurized fluid is present to provide a force on the piston 703 that moves the piston 703. Another relatively high-pressure volume in the chamber 702 may be located above the first pressure seal 710, e.g., from pressurized fluid that infiltrates the volume above the first pressure seal 710. In particular, the volume in the chamber 702 located directly above the first pressure seal 710 may have a high pressure relative to the volume in the chamber 702 located directly above the second pressure seal 712. Thus, in certain implementations, the second fluid pathway 722 connects a relatively high-pressure volume in the chamber 702 (i.e., the volume in the chamber 702 located directly above the first pressure seal 710) with a relatively low-pressure volume in the fluid source 708 or another container or the like. The low-pressure volume in the fluid source 708 may be created because the fluid source 708 is not sealed, e.g., it is open-ended or otherwise vented to create a relatively low-pressure environment therein compared to the environment within the chamber 702.

Thus, the first pressure seal 710 may be a relatively-high pressure seal, and the second pressure seal 712 may be a relatively low-pressure seal. That is, in certain implementations, the first pressure seal 710 experiences a first pressure during normal operation of the caliper brake or hydraulic piston assembly 700, and the second pressure seal 712 experiences a second pressure during normal operation of the caliper brake or hydraulic piston assembly 700, where the first pressure is greater than the second pressure. Thus, in certain implementations, the second pressure seal 712 is structurally configured to experience less pressure than the first pressure seal 710. For example, the second pressure seal 712 may be less robust compared to the first pressure seal 710. Alternatively, the first pressure seal 710 and the second pressure seal 712 may be structurally equivalent or the same.

It will be understood that a variety of pressure seals may be used for one or more of the first pressure seal 710 and the second pressure seal 712. For example, one or more of the first pressure seal 710 and the second pressure seal 712 may include one or more of a buffer seal, a u-cup, an O-ring, a v-packing seal, and a T-seal. In general though, whatever type of seal is used, in preferred embodiments each of the first pressure seal 710 and the second pressure seal 712 are structurally configured to retain fluid from leaking to outside of the chamber 702 or outside of the housing 701. Thus, generally, the present teachings may include a hydraulic piston assembly 700 featuring a combination of two (or more) seals designed to withstand pressure from a pressurized, hydraulic fluid such as oil.

The hydraulic piston assembly 700 may further include a third port 716 (e.g., a secondary bleed port) located above the second pressure seal 712. This third port 716 may establish a third fluid pathway 723 from inside of the chamber 702 to outside of the chamber 702. In particular, the third port 716 may establish a bleed-off for fluid that traverses above the second pressure seal 712. Thus, the third port 716 may be structurally configured to function in the same or similar manner to the single bleed port that is commonly included on existing piston assemblies in the art. In certain implementations, the third fluid pathway 723 established by the third port 716 may terminate in a receptacle 724 or the like. By way of example, such a receptacle 724 in communication with the third fluid pathway 723 may include one or more of a waste oil container for discarding used oil, the fluid source 708 (e.g., where oil is returned to an oil tank or the like), a sump (e.g., where oil is re-used for pressurizing the hydraulic piston assembly 700), or another tank or container.

As shown in the figure, the hydraulic piston assembly 700 may further include a scraper seal 718 (or another type of seal) disposed toward a top of the chamber 702, where the "top" of the chamber 702 is located toward the open end of the bore that defines the chamber 702. The scraper seal 718 may be structurally configured to collect debris from the piston 703 during normal operation of the caliper brake or hydraulic piston assembly 700. In other words, the scraper seal 718 may be structurally configured to exclude contamination from the system, not to retain hydraulic fluid therein. In addition to, or in lieu of, the scraper seal 718, another pressure seal may be included in the hydraulic piston assembly 700, e.g., disposed toward a top of the chamber 702 and located above the second pressure seal 712.

The hydraulic piston assembly 700 may further include a guide band 713 disposed between the piston 703 and a circumferential surface of the chamber 702. As discussed herein, a guide band 713 may not be structurally configured to seal the hydraulic piston assembly 700, but rather the guide band 713 may be structurally configured to prevent or mitigate contact between the piston 703 and the housing 701 or chamber 702. For example, in certain implementations, preventing metal-to-metal contact between the piston 703 and the housing 701 mitigates or prevents scuffing or damage to these components, which can lead to seal damage and eventual leakage. Other bearing surfaces or components may be utilized in addition to or instead of a guide band 713 as will be understood to a person skilled in the art.

Figure 8:
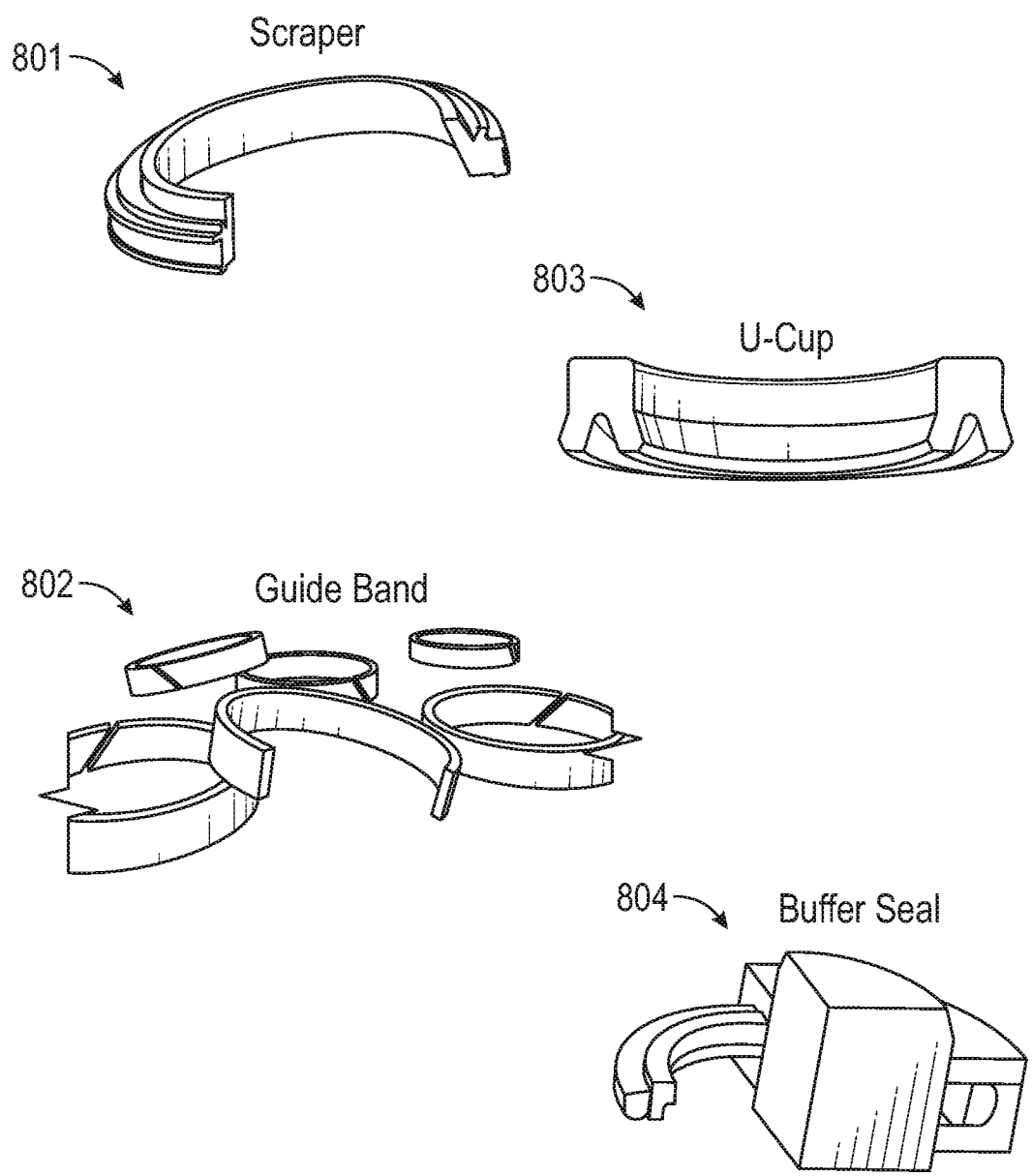
FIG. 8 illustrates cutaways of examples of seals and other components used in hydraulic piston assemblies for context.

FIG. 8 illustrates cutaways of examples of seals and other components used in hydraulic piston assemblies, including a scraper seal 801, a guide band 802, a U-cup 803, and a buffer seal 804.

Thus, as described herein, a hydraulic piston assembly according to the present teachings may include a redundant seal—e.g., both a buffer seal and a U-cup (or similar), thus providing two pressure seals in a single hydraulic piston assembly. In contrast, a hydraulic piston assembly in a more traditional configuration, may include only a single pressure seal—a U-cup or the like.

In certain implementations, a yaw system for positioning a nacelle of a wind turbine includes a slew ring rotatable with the nacelle of the wind turbine on a wind tower, and a yaw brake including one or more yaw pads selectively engageable with the slew ring to assist in controlling a position of the nacelle. The yaw brake may further include a hydraulic piston assembly that includes a housing having one or more chambers, a piston disposed within a chamber of the housing and movable relative to the housing (where a yaw pad of the one or more yaw pads is movable with the piston to selectively engage the slew ring), a first port providing a first fluid pathway from a fluid source into the chamber (where the first port is disposed at or near a bottom of the chamber), and a redundant seal assembly. The redundant seal assembly may include a first pressure seal disposed about a first interior circumference of the chamber disposed above the first port, and a second pressure seal disposed about a second interior circumference of the chamber disposed above the first pressure seal, where the second pressure seal experiences a lower fluid pressure than the first pressure seal during normal operation of the yaw brake. The yaw system may further include a second port disposed between the first pressure seal and the second pressure seal, the second port providing a second fluid pathway from inside of the chamber to outside of the chamber, and the second port establishing a bleed-off for fluid that traverses above the first pressure seal during normal operation of the yaw brake.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A caliper brake featuring a hydraulic piston assembly, comprising:
    a housing comprising one or more chambers;
    a piston disposed within one of the one or more chambers of the housing and movable relative to the housing;
    a first port providing a first fluid pathway from a fluid source into the chamber, the first port disposed at or near a bottom of the chamber; and
    a redundant seal assembly, comprising:
        a first pressure seal disposed about a first interior circumference of the chamber disposed above the first port;
        a second pressure seal disposed about a second interior circumference of the chamber disposed above the first pressure seal, where the second pressure seal experiences a lower fluid pressure than the first pressure seal during normal operation of the caliper brake;
        a second port disposed between the first pressure seal and the second pressure seal, the second port providing a second fluid pathway from inside of the chamber to outside of the chamber, the second port providing a second fluid pathway from inside of the chamber to outside of the chamber, the second port establishing a bleed-off for fluid that traverses above the first pressure seal during normal operation of the caliper brake; and
        a third port disposed above the second pressure seal, the third port providing a third fluid pathway from inside of the chamber to outside of the chamber, the third port establishing a bleed-off for fluid that traverses above the second pressure seal.

2. The caliper brake of claim 1, where the caliper brake comprises a yaw brake disposed on a wind turbine.

3. The caliper brake of claim 2, where the yaw brake is structurally configured to direct a front end of a nacelle in a predetermined alignment relative to a direction of wind in an environment.

4. The caliper brake of claim 2, where the yaw brake comprises a yaw pad that is movable via the piston to selectively engage with a slew ring of the wind turbine.

5. The caliper brake of claim 1, where the second fluid pathway leads from inside of the chamber to the fluid source to recycle fluid that traverses above the first pressure seal.

6. The caliper brake of claim 5, where the second fluid pathway connects a relatively high-pressure volume in the chamber with a relatively low-pressure volume in the fluid source.

7. The caliper brake of claim 1, where the third fluid pathway terminates in a waste receptacle.

8. The caliper brake of claim 1, where the second pressure seal is less robust relative to the first pressure seal.

9. The caliper brake of claim 1, where the first pressure seal is structurally identical to the second pressure seal.

10. The caliper brake of claim 1, further comprising a scraper seal disposed toward a top of the chamber, the scraper seal structurally configured to collect debris from the piston during normal operation of the caliper brake.

11. The caliper brake of claim 1, further comprising a guide band disposed between the piston and a circumferential surface of the chamber.

12. The caliper brake of claim 1, where the first port is structurally configured to permit a pressurized fluid to enter the chamber, via a hose, from outside of the housing.

13. The caliper brake of claim 12, where the pressurized fluid comprises an oil and the fluid source comprises a tank.

14. The caliper brake of claim 1, where one or more of the first pressure seal and the second pressure seal comprises at least one of a buffer seal, a u-cup, an O-ring, a v-packing seal, and a T-seal.

15. The caliper brake of claim 1, where each of the first pressure seal and the second pressure seal are structurally configured to retain fluid from leaking to outside of the chamber.

16. A yaw system for positioning a nacelle of a wind turbine, the yaw system comprising:
    a slew ring rotatable with the nacelle of the wind turbine on a wind tower; and
    a yaw brake comprising one or more yaw pads selectively engageable with the slew ring to assist in controlling a position of the nacelle, the yaw brake further comprising a hydraulic piston assembly, comprising:
        a housing comprising one or more chambers;
        a piston disposed within one of the one or more chambers of the housing and movable relative to the housing, where a yaw pad of the one or more yaw pads is movable with the piston to selectively engage the slew ring;
        a first port providing a first fluid pathway from a fluid source into the chamber, the first port disposed at or near a bottom of the chamber; and
        a redundant seal assembly, comprising:
            a first pressure seal disposed about a first interior circumference of the chamber disposed above the first port;
            a second pressure seal disposed about a second interior circumference of the chamber disposed above the first pressure seal, where the second pressure seal experiences a lower fluid pressure than the first pressure seal during normal operation of the yaw brake;
            a second port disposed between the first pressure seal and the second pressure seal, the second port providing a second fluid pathway from inside of the chamber to outside of the chamber, the second port establishing a bleed-off for fluid that traverses above the first pressure seal during normal operation of the yaw brake; and
            a third port disposed above the second pressure seal, the third port providing a third fluid pathway from inside of the chamber to outside of the chamber, the third port establishing a bleed-off for fluid that traverses above the second pressure seal.

* * * * *